United States Patent [19]

Dieterich et al.

[11] Patent Number: 5,065,242

[45] Date of Patent: Nov. 12, 1991

[54] DEGHOSTING APPARATUS USING PSEUDORANDOM SEQUENCES

[75] Inventors: Charles B. Dieterich, Kingston; Arthur L. Greenberg, Annandale, both of N.J.

[73] Assignee: General Electric Company, Princeton, N.J.

[21] Appl. No.: 546,195

[22] Filed: Jun. 29, 1990

[51] Int. Cl.$^5$ .......................................... H04N 5/213
[52] U.S. Cl. .................... 358/167; 358/177; 358/160
[58] Field of Search ............... 358/905, 167, 166, 36, 358/37, 177, 147; 379/410

[56] References Cited

U.S. PATENT DOCUMENTS

| | | | |
|---|---|---|---|
| 4,374,400 | 2/1983 | Holmes | 358/167 |
| 4,476,491 | 10/1984 | Murata et al. | 358/167 |
| 4,502,077 | 2/1985 | Morotomi et al. | 358/167 |
| 4,578,544 | 3/1986 | de Verdiere et al. | 179/170.2 |
| 4,594,479 | 6/1986 | Farrow et al. | 179/170.2 |
| 4,686,570 | 8/1987 | Lewis, Jr. et al. | 358/188 |
| 4,727,424 | 2/1988 | Chao | 358/167 |
| 4,864,403 | 9/1989 | Chao et al. | 358/167 |
| 4,896,213 | 1/1990 | Kobo et al. | 358/147 |
| 4,897,725 | 1/1990 | Tanaka et al. | 358/167 |
| 4,914,507 | 4/1990 | Smith et al. | 358/11 |

FOREIGN PATENT DOCUMENTS 63-142778 6/1988 Japan .

OTHER PUBLICATIONS

"A Tutorial on Ghost Cancelling in Television Systems", by W. Ciciora et al., IEEE Transactions on Consumer Electronics, vol. CE-25, Feb. 1979, pp. 9-44.
"Digital Signal Processing", by A. V. Oppenheim et al., Prentice-Hall, Inc., pp. 491-529.

Primary Examiner—Tommy P. Chin
Assistant Examiner—Tuan V. Ho
Attorney, Agent, or Firm—Joseph S. Tripoli; Eric P. Herrmann; James B. Hayes

[57] ABSTRACT

Deghosting apparatus for eliminating multipath signal components in a received transmitted television signal incorporates a training signal which is a finite duration sequence of repetitions of a $2^n-1$ psuedorandom sequence. The $2^n-1$ pseudorandom sequences are mapped into $2^r$ sample intervals at either the transmitter or the receiver to facilitate fast Fourier transform processing. Power spectra of the received and mapped training signal and a stored version of the training signal are deconvolved with the deconvolution coefficients produced in logarithmic form. The logarithms are inverse Fourier transformed to produce delay coefficients related to the time of occurrence of the multipath signals, which coefficients are utilized to program variable delay circuitry in an adaptive filter to cancel the multipath components.

11 Claims, 4 Drawing Sheets

DEGHOSTING APPARATUS USING PSEUDORANDOM SEQUENCES

This invention relates to apparatus for removing multipath distortion from video signals.

BACKGROUND OF THE INVENTION

This invention will be described in terms of eliminating ghosts from transmitted television signals, however it is applicable to eliminating multipath components or echoes from a wide variety of transmitted signals. Many methods have been developed for removing multipath distortion (deghosting) from video signals. In general these methods employ techniques at the receiver for comparing a received test signal with an ideal version of the test signal in order to configure a filter to remove multipath components from the received signal.

One of the main difficulties with this approach is the selection of an appropriate test signal. Certain systems use the transition of the vertical synchronizing component of the video signal as a test signal. Other systems add a training signal to the broadcast signal specifically for use in deghosting. Nominally the training signal is added to a line interval in the vertical blanking period of the video signal and takes the form of a 2T pulse or sin x/x type signal. For both the 2T pulse sin x/x, or vertical synchronizing signals the normal bandlimiting of the broadcast signal tends to compromise deghosting performance. In addition, the power density of these signals is relatively low which tends to reduce deghosting performance in the presence of noise.

Another type of signal which has been implemented as a training signal is a pseudorandom sequence inserted in a horizontal line interval. The pseudorandom sequence can be transmitted with significant power density. Typically the transmitted pseudorandom sequence is correlated, in the time domain, with an uncorrupted version of the sequence at the receiver. The result of the correlation produces pulses for the occurrence of the direct signal and each multipath signal. Measuring the intervals between the pulse corresponding to the direct signal and the pulses corresponding to the multipath signals provides information relating to the time delay of the multipath signals. Measuring the relative amplitudes of the pulses provides information relating to the strength of the multipath signals. Using the timing and amplitude information an appropriate filter may be configured to eliminate the multipath signals. See for example U.S. Pat. Nos. 4,594,479 and 4,578,544 for echo cancelling systems employing pseudorandom sequences, which patents are incorporated herein by reference. The drawback to this type of time domain processing is that channel bandlimiting and noise in the transmitted signal tend to create significant sidelobes in the correlated output signal which obscure detection of multipath components having short delays relative to the direct signal.

Systems have also been developed which incorporate frequency domain processing for multipath distortion or echo cancellation. In these systems a Fourier transform is performed on a transmitted training signal. A Fourier transform is calculated for a non-corrupted training signal. The transmitted Fourier transform is divided by the Fourier transform of the non-corrupted training signal, and an inverse Fourier transform is performed on the quotient, providing a sequence which corresponds to the set of filter coefficients for configuring a correction filter. See for example "A Tutorial on Ghost Cancelling in Television Systems" by W. Ciciora et al., IEEE Transactions on Consumer Electronics, Vol. CE-25, February 1979, pp. 9-44 which is incorporated herein by reference.

Generally it is impractical to include Fourier transform apparatus in consumer products because the hardware required to implement the function is significant. The Fourier transform hardware and processing time may be reduced by the use of fast Fourier transforms, (FFTs). However, to insure reliable results using FFTs particular types of training signals should be implemented. For example, signals which are conducive to FFTs are generally in the form of finite duration sequences. Secondly, to realize the efficiency of the FFT on sequences, the sequences must have a number of samples in a sequence equal to a power of two.

The optimal sequences for use as training signals are maximal pseudorandom sequences which provide the best correlation gain per number of bits in the sequence. Maximal pseudorandom sequences have $(2^n - 1)$ bit lengths (n is an integer). Thus in general maximal pseudorandom sequences are not conducive to FFT processing.

SUMMARY OF THE INVENTION

The present invention includes multipath cancellation which incorporates the advantages of a pseudorandom sequence training signal and the hardware efficiency of FFT's for frequency domain processing. A $(2^n - 1)$ bit pseudorandom sequence training signal is incorporated in a horizontal line of a television signal. The training signal is raster mapped into a $2^n$ sample space either at the transmitter before transmission, or at the receiver after reception of the television signal. The raster mapped received signal is transformed via FFT apparatus and deconvolved with an FFT of a non-corrupted raster mapped like sequence for generating coefficients for a multipath correction filter.

DETAILED DESCRIPTION

Figure 1:
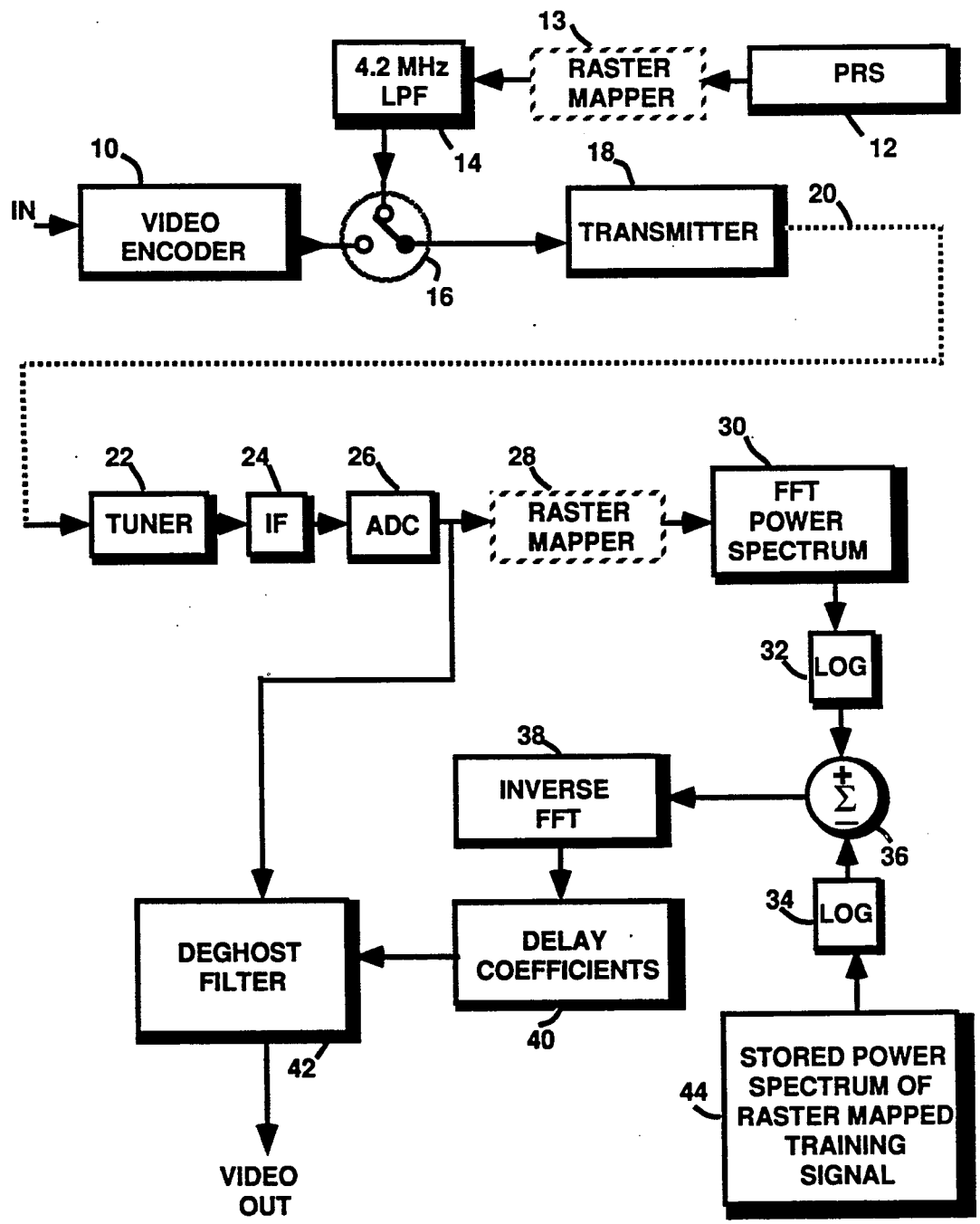
FIGS. 1 and 3 are block diagrams of alternative deghosting systems embodying the present invention.

The process of eliminating multipath signals typically involves determination of the characteristics of the transmission channel and programming a filter to provide a transfer function which is the reciprocal of the transmission channel in order to cancel the multipath components. If the signal to be transmitted is designated $X(\omega)$, the received signal is designated $Y(\omega)$, and the channel characteristic is designated $H(\omega)$, then $$Y(\omega) = X(\omega) H(\omega) \qquad (1)$$

where $Y(\omega)$, $X(\omega)$ and $H(\omega)$ are the Fourier transforms of the time domain signals $y(t)$, $x(t)$ and the time domain characteristic $h(t)$. The channel characteristics $H(\omega)$ may be determined by sending a known signal during predetermined training intervals and dividing the signal $Y(\omega)$, received during the training intervals, by a stored version of the training signal. That is $$H(\omega) = Y(\omega)/X(\omega) \qquad (2)$$

The process of determining the function $Y(\omega)/X(\omega)$ will be designated deconvolution.

Consider a signal composed of a repeated finite duration sequence each sequence occurring over an interval I. It is known that convolution of such a signal is circular. That is, any slice of duration I of the signal may be convolved with the known sequence and produce a like correlation result albeit displaced in time. That is, if two slices $I_1(t)$ and $I_1(t+\Delta t)$ are respectively convolved the correlation results will be displaced $\Delta t$ apart. In the frequency domain, the convolution of finite duration sequences is simply the product of the Fourier transforms of the signals to be convolved. The convolution of $y(t)$ and $s(t)$ thus corresponds to the product $Y(\omega)S(\omega)$. Consider that $S(\omega) = 1/X(\omega)$, then $H(\omega) = Y(\omega)/X(\omega)$ is also a convolution function and for finite duration sequences will be circular.

The delay times of multipath components present in the received signal may be determined from the cepstrum of equation 2 where $X(\omega)$ and $Y(\omega)$ are the respective power spectra of the training signal $x(t)$ and the received signal $y(t)$. The cepstrum is the inverse Fourier transform of the logarithm of the quotient $Y(\omega)/X(\omega)$. Generally the cepstrum produces a series of pulses each of which is determinative of a multipath component relative to a time datum corresponding to the selected interval over which deconvolution is performed. Stated in another way each pulse of the cepstrum identifies the relative position of a nonzero amplitude coefficient of a deghosting filter to be programmed with a transfer function corresponding to the inverse characteristic of the transmission channel.

For practical implementation of the foregoing method of determining multipath signal component delays, in consumer television receivers, it is necessary to take advantage of FFT methods. This tends to constrain the training sequences to occur in $2^n$ sample periods. In order to achieve maximal correlation response in the convolution process the training sequence should a) have as large an amplitude as the system signal format will allow, and b) be in the form of a maximal pseudorandom sequence (e.g., a $2^n - 1$ bit code).

Maximal pseudorandom sequences are bilevel signals composed of predetermined sequences of binary ones and zeroes. When used as a training signal they are transmitted via amplitude modulation of a carrier. Upon reception and demodulation the sequence will be generally in analog form. FFT processors are digital devices and operate on, e.g., binary signals. Therefore, the received signal must first be converted to digital form via an analog-to-digital converter (ADC). Typically, the ADC will be synchronized to a synchronizing component of the transmitted signal. The sample rate of the ADC is usually selected to be four times the frequency of the color subcarrier frequency and phase locked to the color burst component. For the ADC to faithfully reproduce a transmitted sequence of ones and zeroes, the transmitted sequence should be synchronized to the sample timing of the ADC. That is, if the ADC samples at a rate of four times the color subcarrier frequency, then the bits of the training signal should be generated at the transmitter at a rate of four times color subcarrier or an even submultiple thereof. In addition, the start of the sequence should be referenced to a predetermined time datum such as an edge of the horizontal sync pulses. Under these conditions a particular transmitted sequence corresponds to a predetermined sequence of samples. That is a pseudorandom sequence of, e.g., 255 bits generated at four times subcarrier will be represented by 255 consecutive samples at the receiver.

As noted above, for FFT conversion, the sequence of samples must contain $2^n$ samples. The $2^n - 1$ bit pseudorandom sequence may be converted to $2^n$ samples for FFT processing by raster mapping. Raster mapping is the process of interpolating a signal occurring over a given sample space to occupy a larger or a smaller sample space. U.S. Pat. No. 4,914,507 entitled "Video-signal Time Expansion/Compression Apparatus Using Programmed Output Values" and incorporated herein by reference, describes exemplary raster mapping apparatus. The raster mapping of the $(2^n - 1)$ bit pseudorandom sequence training signal may be performed either at the transmitter or at the receiver.

Figure 5:
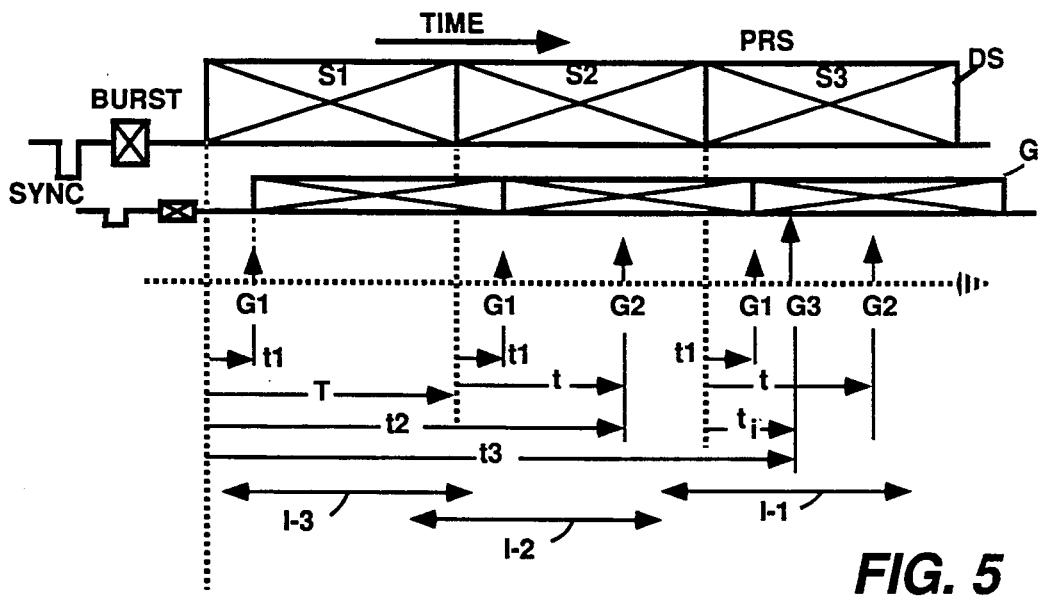
FIG. 5 is a pictorial representation of a sequence of pseudorandom sequences with indications of the ghost delays for ghost detection in respective ones of the sequence.

Finally, in order to take advantage of circular convolution of finite duration sequences, the training signal should include several repetitions of the pseudorandom sequence. FIG. 5 shows schematically the arrangement of a training signal in one line of a transmitted video signal including three repetitions of a sequence.

Referring to FIG. 1 baseband video signal is applied to a video encoder 10 wherein it is composed in a standard composite video format, e.g., NTSC. The encoded video signal is applied to one input terminal of a multiplexing switch 16. A maximal length pseudorandom sequence (hereinafter PRS) provided by a pseudorandom sequence generator 12 is applied to a second input terminal of the multiplexing switch 16. The multiplexing switch 16 is conditioned by timing circuitry (not shown) to apply to a transmitter 18, the PRS during a predetermined line interval of the vertical interval of the composite video signal, and to apply the composite video signal to the transmitter at other times. The transmitter 18 conditions the multiplexed signal for transmission over broadcast channels, cable, etc.

The PRS generator 12 may be a read only memory, ROM, programmed at respective consecutive memory locations with consecutive bits of the sequence. Timing and address circuitry therein conditions the ROM to output consecutive like sequences (e.g., 3) of for example a 255 bit PRS. Alternatively, generator 12 may be a $(2^n - 1)$-bit shift register which is arranged to contain the desired code, and which is clocked to output the bits of such code in a serial bit stream. The output PRS from the generator 12 is coupled to a lowpass filter which limits the bandwidth of the PRS to the bandwidth of the composite video signal. If rastermapping of the PRS is to be performed in the transmitter, a raster mapper 13, shown in phantom, is included between the generator 12 and the lowpass filter 14. Raster mapper 13 converts the training signal occurring over a $2^n - 1$ sample space to a signal occurring over a $2^n$ sample space.

If the video signal is in binary format which is to be converted to analog form in the transmitter 18, and the generator 12 is in the form of a ROM, a lowpass filtered, raster mapped version of the PRS may be programmed in binary format in the ROM obviating the raster mapper 13 and the lowpass filter 14.

The timing of the PRS circuitry 12 will be arranged to provide a sequence of bits synchronous with a component (e.g., color subcarrier) of the composite video signal to permit synchronous detection of the PRS at the receiver.

The transmitted signal is detected by a conventional tuner circuit 22 at the receiver and applied to intermediate frequency, IF, processing circuitry 24. The signal provided by the IF circuitry is coupled to an ADC 26 wherein it is converted to pulse code modulated, PCM, samples in for example binary format. The sample frequency of the ADC is synchronized with, for example, the color subcarrier in order that the sample space of a sequence of the PRS conforms to a predetermined number of samples.

Samples produced by the ADC 26 are coupled to a deghosting filter 42, which substantially removes the multipath signal components. Output video signal from the filter 42 is applied to conventional video signal processing circuitry (not shown) wherein the luminance and chrominance components are separated and conditioned for display or recording.

Samples from the ADC 26 are also applied to FFT processing circuitry 30 wherein the frequency spectrum of the signal is generated. If the PRS has been raster mapped at the transmitter, samples from the ADC are coupled directly to the FFT circuitry 30. Conversely, if the PRS has not been raster mapped at the transmitter, then the samples from the ADC 26 are applied to a raster mapper 28 which converts a $2^n - 1$ sample interval of the PRS to a $2^n$ sample interval. The raster mapped signal provided by the mapper 28 is then coupled to the FFT circuitry 30.

The FFT circuitry 30 is conditioned by timing circuitry (not shown) to recognize the line interval containing the PRS and to perform a fast Fourier transform on only this portion of the received signal. Output signal provided by the FFT circuitry 30 corresponds to the signal $Y(\omega)$ in equation (1). The signal $Y(\omega)$ from FFT circuitry 30 is converted to logarithmic form, log $(Y(\omega)$, in a linear-to-log converter 32, and the logarithms are coupled to the minuend input terminal of a subtracter circuit 36.

An uncorrupted version of a rastermapped PRS training signal $X(\omega)$ is stored in for example a ROM 44. This signal is converted to logarithmic form in a linear-to-log converter 34 and applied to the subtrahend input terminal of the subtracter circuit 36. The subtracter 36 provides the signal log $(Y(\omega))$-log$(X(\omega))$ which is equivalent to log $(Y(\omega)/X(\omega))$.

The signal stored in circuitry 44 corresponds to one repetition of the PRS. The timing of the production of samples from the circuitry 44 is arranged to correspond to particular intervals of the received sequence. Note however, that because of the circular convolution features of finite duration sequences, it is not necessary to constrain the timing of the sequence provided by the circuitry 44 to correspond to a unique portion of the received signal.

The logarithmic differences provided by the subtracter 36 are applied to an FFT circuit 38 which provides the inverse Fourier transform of log$(Y(\omega)/X(\omega))$ and which corresponds to the cepstrum of $H(\omega)$. The cepstrum is a sequence of pulses, the relative times of occurrence of which correspond to the delay intervals of respective multipath components. The inverse transform is applied to circuitry 40 which generates delay coefficients corresponding to the respective multipath components. Circuitry 40 in effects compares the pulses provided by the FFT circuitry 38 to the timing datum to generate the delay coefficients.

Figure 2:
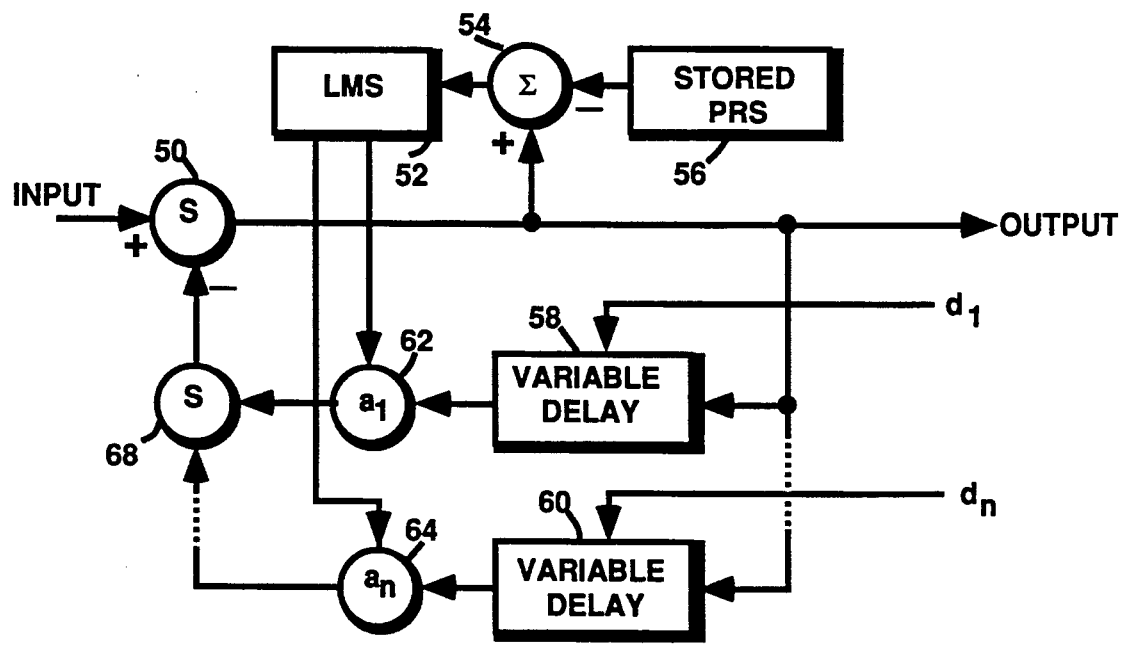
FIG. 2 is a block diagram of a portion of the deghosting filter shown in FIG. 1.

The delay coefficients are applied to the deghosting filter 42. In this embodiment it is presumed that the deghosting filter includes a plurality of variable delay elements, each of which has its delay interval controlled via one of the delay coefficients. (Reference is made to U.S. Pat. No. 4,727,424 for exemplary variable delay circuitry for use in multipath distortion correction apparatus.) FIG. 2 illustrates an exemplary deghosting filter of this type. The filter illustrated in FIG. 2 is of the recursive type having a plurality of feedback paths each of which includes a variable delay and a scaling circuit. Input signal is applied to the minuend input terminal of a substracter circuit 50. Output signal, which is provided by the subtracter circuit 50, is coupled to the input terminals of the respective feedback paths (58, 62), (60, 64) wherein the output signal is delayed by differing time intervals in the respective delay elements (58, 60) and amplitude scaled in the respective scaling circuit (62, 64). Each feedback path provides a signal corresponding to an estimate of one of the respective multipath signal components. The respective feedback signals are summed in an adder 68 and applied to the subtrahend input terminal of the subtracter circuit 50. The feedback signal applied to the subtracter circuit 50 essentially cancels the multipath components in the received signal.

The amplitude scaling coefficients are generated via circuits elements 52–56 and applied to the scaling circuits 62–64. This is performed by comparing in the time domain an uncorrupted version of the training signal stored in the receiver, with the output signal provided by the subtracter circuit 50. The differences between the received sequence signal and stored sequence are evaluated for example using least mean square processes to generate the scaling coefficients. These techniques are known for multipath cancellation apparatus and therefore will not be described in detail. However, reference is made to U.S. Pat. No. 4,686,570 for a more detailed explanation of exemplary apparatus for deriving amplitude scaling coefficients.

Operation of the multipath component cancellation system proceeds as follows. The training signal received during one field interval is evaluated in the frequency domain to determine the relative delays of respective multipath signal components, and generate the delay coefficients which are applied to respective ones of the variable delay elements in filter 42. During the next and a predetermined number of further field intervals, the filter circuitry analyzes the received training signals to iteratively generate the amplitude scaling coefficients. Note that the calculation of multipath delays is independent of the calculation of the amplitude scaling coefficients, though the converse is not true. However, in general, once the system is initialized by determination of the first set of delay coefficients, the calculation of delay coefficients and amplitude scaling coefficients may be performed in parallel during each field interval, thereby allowing the system to quickly adjust to changing multipath signals, such as those generated by moving aircraft.

It should be noted that the FFT processing and the deghosting filter processing may be performed on either in-phase signals only, or with complex processing on quadrature phase related components of the received signal. Preferably however the FFT processing will be performed on complex or quadrature phase related components of the received signal.

Referring back to FIG. 1, the system may be simplified with respect to hardware components by utilizing time division multiplexed processing. For example, the training signal may be stored as a $2^n-1$ bit serial signal in a $(2^n-1)$ bit shift register or it may be generated directly with an n-bit shift register. This signal may be applied to the raster mapper 28, during intervals when the transmitted training signal is absent, raster mapped, FFT processed, log converted and stored in memory for use when the received and processed training signal is available. In addition, the output of the subtracter circuit 36 may be time division multiplexed with the signal from the raster mapper, so that the FFT circuit 30 may be utilized to perform the inverse transform. In this manner elements 34, 44 and 38 may be eliminated at the expense of two multiplexing switches and some memory.

Figure 3:
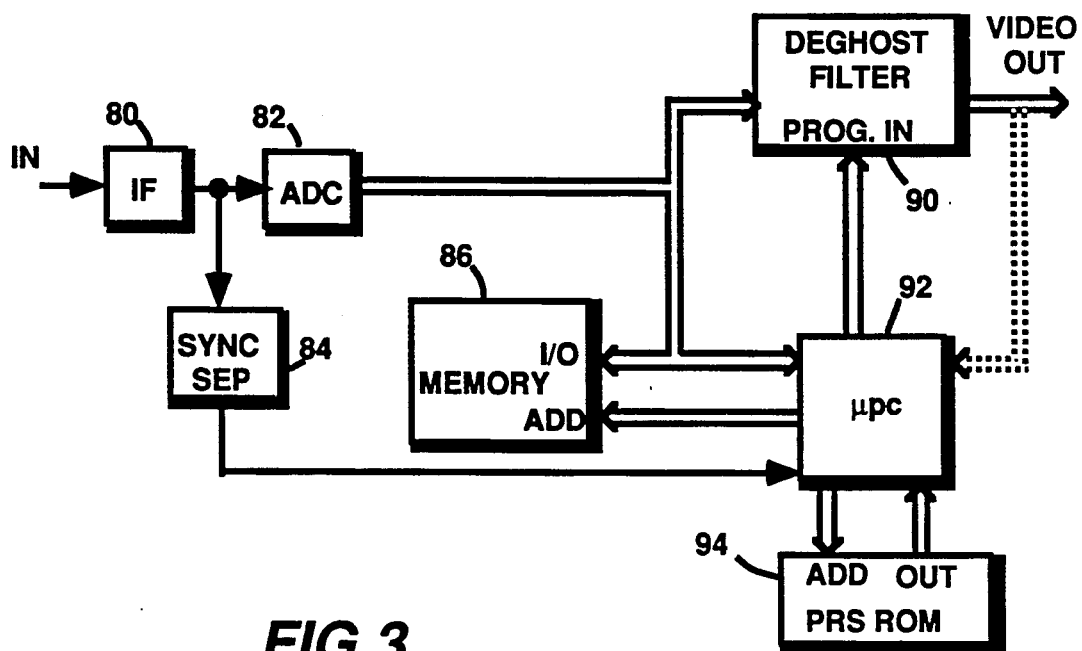

FIG. 3 illustrates an alternative embodiment of apparatus in a receiver for providing multipath component cancellation. In this embodiment signal including multipath components from for example conventional tuner circuitry is coupled to an ADC 82 via an IF processing stage 80. PCM samples from the ADC 82 are coupled to a deghosting filter 90, a random access memory circuit, RAM, 86 and a microprocessor element, $\mu$pc, 92. Signal from the IF circuitry 80 is also coupled to a sync separator 84 which provides vertical and horizontal synchronizing signals to the $\mu$pc to establish the requisite timing references. An uncorrupted version of the training signal is provided by a PRS ROM 94. All FFT and delay coefficient calculations are performed by the $\mu$pc 92 responsive to the received training signal in RAM 86 and the uncorrupted training signal in PRS ROM 94.

Figure 4:
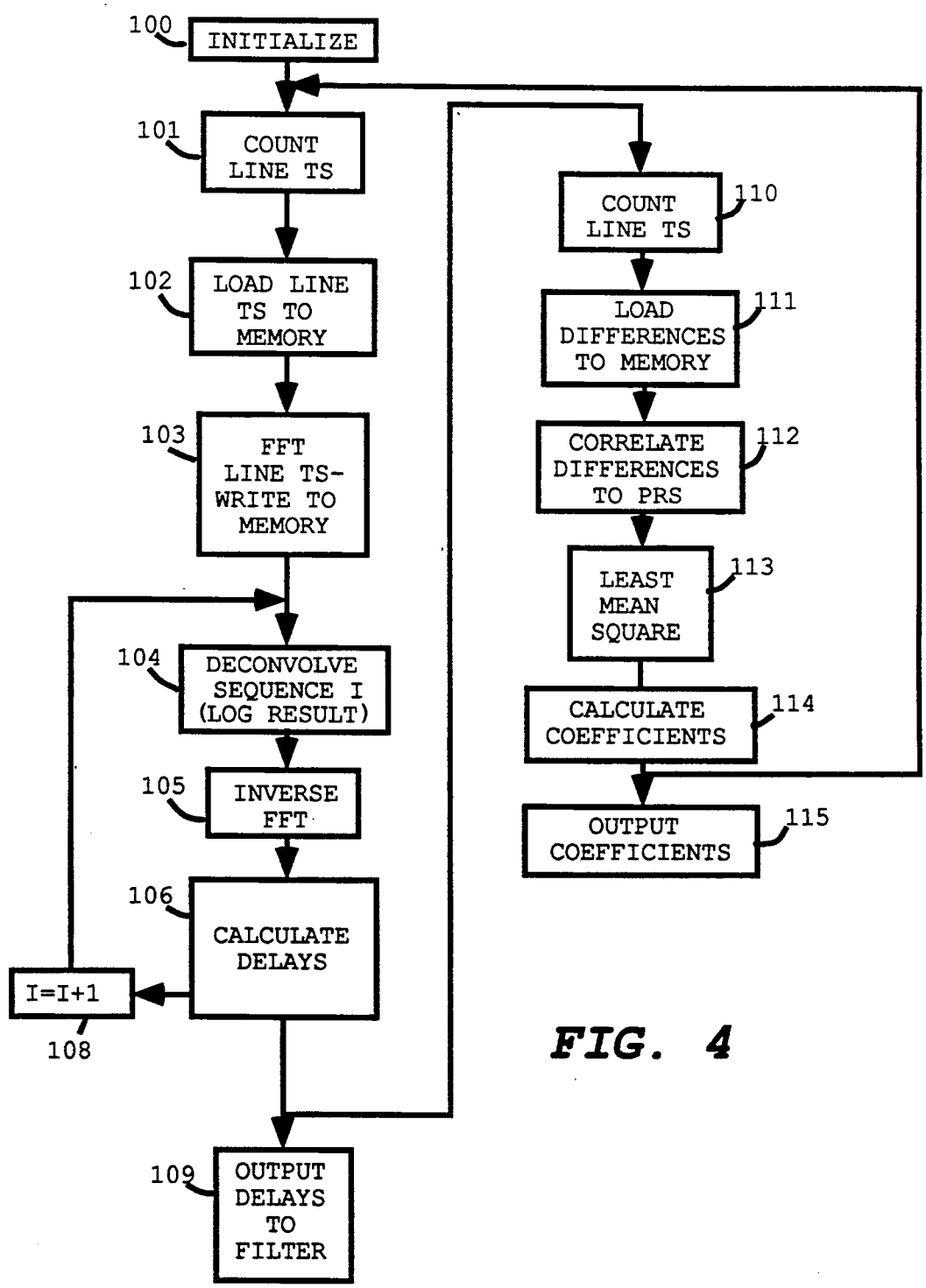
FIG. 4 is a flowchart representing the processing steps of the FIG. 3 circuitry.
Figure 6:
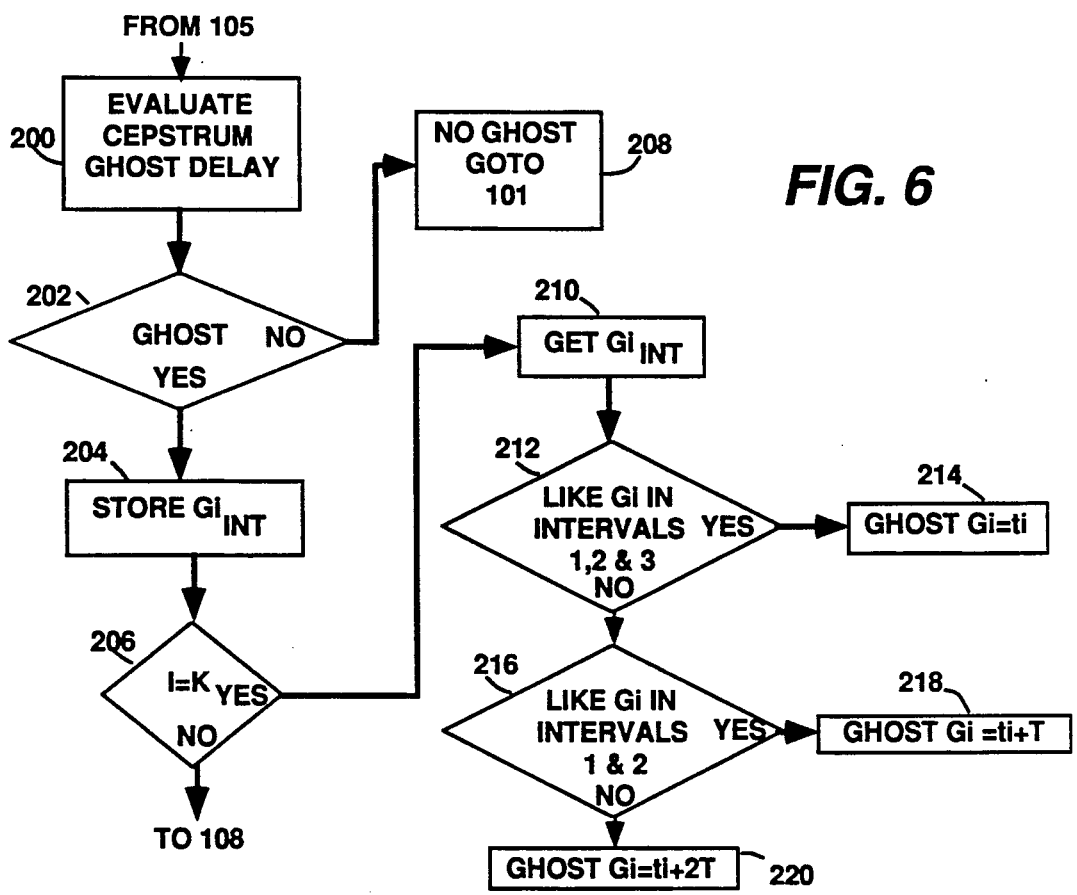
FIG. 6 is a flowchart of an exemplary algorithm for ascertaining the delay of a ghost from deconvolution of a finite duration sequence as consisting of repetitions of a pseudorandom sequence as shown in FIG. 5.

Operation of the FIG. 3 apparatus is detailed in the flowcharts illustrated in FIGS. 4 and 6. However, before describing this operation, reference is made to FIG. 5 in order to elucidate part of the processing function.

As indicated previously, to facilitate FFT processing and circular convolution, it is desirable to transmit the training signal as a finite duration sequence. This is indicated by the uppermost waveform DS in FIG. 5, which illustrates one line of the video signal (preferably in the vertical blanking interval) including a horizontal sync pulse, SYNC, a color burst reference, BURST, and three repetitions S1, S2 and S3 of a pseudorandom sequence. If the signal DS is transmitted in a multipath environment, upon reception it will comprise a composite signal including DS and delayed, attenuated versions of itself. For example, the received signal may comprise the sum of signal DS and a delayed version of itself such as signal G, shown immediately below signal DS. The signal G represents a multipath signal delayed with respect to the direct signal DS, by a time interval t1.

The delay calculation process involves deconvolving the received signal with one repetition of the stored training signal. One repetition of the training signal encompasses an interval I equal to T seconds. To perform deconvolution it is not necessary that the stored training signal be time aligned with a single complete repetition of the transmitted training signal. Rather the stored training signal may be deconvolved with any slice of duration T of the transmitted signal. It is desirable however not to select an interval near the beginning end of repetition S1 or the trailing end of repetition S3 to avoid end effects.

Assume that the deconvolution is performed over the interval I-1 of duration T, and that a multipath component G3 is detected. The delay of this component, relative to the direct signal, may correspond to a time t3, i.e., a ghost equivalent to the ghost G but shifted rightward by a time of approximately t3-t1. In this instance the detected result is a correlation of the stored signal with a delayed version of repetition S1. Alternatively, the detected ghost may be the result of a correlation of the stored signal with a delayed version of repetition S2 or S3. In order to resolve this ambiguity two addition deconvolution calculations are performed, one over a slice of the received signal including the majority of repetition S2 and one over a slice including the majority of repetition S1. These slices are illustrated by the intervals designated I-2 and I-3 respectively. Assuming for simplicity that the three intervals I-1, I-2 and I-3 are arranged end-to-end, and a ghost G1 with like delay time (t1) is detected in each interval, then that ghost has a relatively short delay equal to the time t1. Alternatively, if a ghost (G2) is detected in intervals I-1 and I-2 but not I-3, then the ghost G2 is delayed by at least a time T since no correlation occurred in interval I-3. Note delay calculations are relative to the particular convolution interval. Thus if the delay of ghost G2 is calculated as t in both intervals I-1 and I-2, its delay time t2 relative to the direct signal is equal to t plus the time of one repetition T or $t2=t+T$. Similarly, if a ghost G3 with relative delay time $t_i$ is detected only in the interval I-1, its absolute delay t3 is equal to $ti+2T$.

Since it is not desirable to employ intervals of the received training signals near the ends of the first and last repetitions, the deconvolution intervals may not be end to end. If in fact two intervals overlap such as intervals I-3 and I-2 in FIG. 5, like ghosts detected in these intervals will occur with the same calculated delay times.

The number of repetitions of the PRS included in the training signal is a design choice, however detection sensitivity is greater for a PRS with a greater number of bits. If the bit rate of the PRS is equal to four times the color subcarrier frequency of the video signal, three sequences of 255 bits or six sequences of 127 bits conveniently fit in a line interval. Further, if it is known that multipath components cannot exhibit delays greater than the duration, T, of a single repetition of the PRS, multipath delays can be calculated with deconvolution performed over a single interval. In this instance only one complete repetition of the PRS is required in the training signal. However, bits corresponding to the trailing and leading ends of like PRS's should be appended to the leading and trailing ends respectively of the complete repetition to permit circular convolution and to preclude end effects.

With this discussion in mind refer to FIGS. 3, 4 and 6. When the system is energized the deghosting or multipath cancellation system is initialized (100) upon reception of a vertical synchronizing pulse. The $\mu$pc 92 counts (102) horizontal synchronizing pulses until it reaches line number TS containing the training signal. If the transmitted training signal has been raster mapped at the transmitter the $\mu$pc conditions the RAM 86 to store the transmitted training signal (102). Alternatively, if the training signal has not been raster mapped, $\mu$pc 92 may be programmed to perform the raster mapping function and load the raster mapped version to RAM 86. The received training signal is stored in memory because it is presumed that economical microprocessors are not currently available which can perform the FFT's in real time.

Once the transmitted training signal is captured in RAM 86, the training signal is accessed from the RAM 86 by the μpc and an FFT is performed on the training signal (103). The generated power spectrum coefficients are stored in the RAM 86. The FFT may be performed over the entire three sequences S1, S2, S3 as a unit, however it is preferable to perform separate FFT's over $2^n$ sample slices corresponding to the intervals over which deconvolution is desired. At this point the stored uncorrupted training signal (one repetition of the PRS) is accessed from ROM 94 and the power spectrum coefficients stored in RAM 86 are accessed and deconvolution (104) is performed over one interval of the received signal, for example interval I-1. Logarithmic results of the convolution are stored which results are then inverse Fourier transformed (105) to produce the cepstrum corresponding to multipath delay times over interval I-1. The delay times are evaluated (106 and 200, FIG. 6). If no ghosts (multipath signals) are detected (202) the system returns to step 101. If ghosts are detected the results are stored 204 and a check is made to determine if deconvolution has been performed over all intervals (206). If the deconvolutions have been completed, the stored delay results are accessed (210) and a comparison is made for like results in all intervals (212). In this embodiment three intervals are presumed. If ghosts Gi with like delays, ti, are detected in all three intervals (212) a delay coefficient corresponding to time $t_i$ is generated (214). If ghosts Gi are detected, but which do not have like delays in all three intervals, then these ghosts are evaluated for like delays ti in intervals 1 and 2 (216). If these are ghosts Gi with like delays in intervals 1 and 2 then delay coefficients corresponding to (ti+T) are generated for these ghosts. Finally, if detected ghosts Gi only occur in interval 1 then delay coefficients corresponding to ($t_i$+2T) are generated for these ghosts (220). The delay coefficients are then applied to the deghosting filter 90.

Returning to step 206, if deconvolution over all intervals has not been completed, an index I is incremented (108) and the system returns to step (104).

The deghosting filter 90 may be similar to the exemplary filter illustrated in FIG. 2 which includes circuitry for calculating the amplitude scaling coefficients. Alternatively, the filter 90 may exclude the latter circuitry and the amplitude scaling coefficients may be calculated by the μpc 92. In this instance the output signal provided by the filter 90 is coupled to the μpc 92 for evaluation (shown in phantom).

Reference is again made to FIG. 4 for operation in this mode. After the delay coefficients are calculated (106) and applied to the filter 90, the μpc is again conditioned to count (110) to the line containing the training signal. During this line interval the sample differences provided by subtracter 50 (FIG. 2) are stored in memory (111). These differences are compared (112) with an uncorrupted version of the training signal available from ROM 94. From the results of the comparison amplitude scaling coefficients are generated (113, 114) by means of one of the known algorithms, and the coefficients applied to the scaling circuits in the filter 90. The system may be arranged to iteratively calculate the scaling coefficients over several field intervals or it may be arranged as shown in FIG. 4 to alternately recalculate delay and amplitude scaling coefficients.

What is claimed is:

1. A system for providing a television signal, including a training signal, comprising:
    a source of composite television signal;
    a source of a pseudorandom sequence having $2^n-1$ bits occurring in a $2^n-1$ sample interval;
    means for mapping said $2^n-1$ bit pseudorandom sequence into a $2^r$ sample interval to provide a mapped sequence, n and r both integers with r greater than or equal to n; and
    means for time division multiplexing said composite television signal and said mapped sequence.

2. The system set forth in claim 1 further including means for providing successive repetitions of said mapped sequence, and wherein said successive repetitions are multiplexed into one line interval of said composite video signal.

3. A system in a television signal receiving apparatus for cancelling multipath signal components in a transmitted television signal including a training signal, said training signal including at least one complete repetition of a $2^n-1$ bit pseudorandom sequence, comprising:
    means for detecting and sampling said transmitted television signal;
    filter means, having a plurality of signal paths each including programmable amplitude scaling circuitry responsive to amplitude coefficients and variable delay circuitry responsive to delay coefficients, and having means for combining signals provided by respective ones of said plurality of signal paths, said plurality of signal paths coupled to said means for detecting said transmitted television signal, and said means for combining signals, providing said transmitted signal substantially free of said multipath signal components;
    means responsive to said sampled transmitted television signal, for frequency domain processing said training signal included in said transmitted television signal to provide said delay coefficients; and
    means responsive to said sampled transmitted television signal, for time domain processing said training signal included in said transmitted television signal to provide said amplitude coefficients.

4. The system set forth in claim 3 wherein said means responsive to said sampled transmitted television signal, for frequency domain processing said training signal includes:
    means for mapping $2^n-1$ bit portions of said training signal included in said transmitted signal into $2^r$ sample intervals to provide a raster mapped training signal, r and n both integers with r greater than or equal to n.

5. A system in a television signal receiving apparatus for cancelling multipath signal components in a transmitted television signal including a training signal, said training signal including at least one complete repetition of a $2^n-1$ bit pseudorandom sequence, comprising:
    means for detecting and sampling said transmitted television signal;
    filter means, having a plurality of signal paths each including programmable amplitude scaling circuitry responsive to amplitude coefficients and variable delay circuitry responsive to delay coefficients, and having means for combining signals provided by respective ones of said plurality of signal paths, said plurality of signal paths coupled to said means for detecting said transmitted television signal, and said means for combining signals, providing said transmitted signal substantially free of said multipath signal components:

means for mapping $2^n-1$ bit portions of said training signal included in said transmitted signal into $2^r$ sample intervals to provide a raster mapped training signal, r and n both integers with r greater than or equal to n;

means for fast Fourier transform processing said raster mapped training signal to provide a power spectrum thereof;

means for providing a reference signal corresponding to an uncorrupted version of the power spectrum of said $2^n-1$ bit pseudorandom sequence mapped into a $2^r$ sample interval;

means for deconvolving the power spectrum of said raster mapped training signal with said reference signal to generate a deconvolved signal, and for providing the cepstrum of said deconvolved signal;

means responsive to said cepstrum for generating said delay coefficients; and means responsive to said sampled transmitted television signal, for time domain processing said training signal included in said transmitted television signal to provide said amplitude coefficients.

6. The system set forth in claim 5 wherein said training signal is in the form of a finite duration sequence and said means responsive to said transmitted television signal, for deconvolving includes means for sequentially deconvolving different portions of said raster mapped training signal with said reference signal to generate said delay coefficients.

7. The apparatus set forth in claim 5 wherein said means for deconvolving includes:

first means, coupled to said means for fast Fourier transform processing, for generating the logarithm of the power spectrum of said raster mapped training signal;

second means, coupled to said means for providing a reference signal, for generating the logarithm of the power spectrum of said uncorrupted version; and subtraction means, coupled to said first and second means, for generating differences between said logarithms of the power spectra of said uncorrupted version and said raster mapped training signal.

8. The apparatus set forth in claim 7 wherein said means for deconvolving further includes means for providing the inverse Fourier transform of the differences between said logarithms of the power spectra of said uncorrupted version and said raster mapped training signal.

9. Multipath signal cancellation apparatus of the type including a filter adaptively programmed with variable scaling and delay coefficients and responsive to a transmitted signal including a training signal and multipath signal components, said training signal being a finite duration sequence of repetitions of a $2^n-1$ bit pseudorandom sequence, said apparatus comprising:

means for detecting and sampling said transmitted signal;

means, responsive to said sampled signal, for mapping $2^n-1$ bit intervals of said training signal into $2^r$ sample intervals to provide a raster mapped training signal, n and r being integers with r greater than or equal to n;

a source of uncorrupted training signal corresponding to a repetition of said $2^n-1$ bit pseudorandom sequence; and means responsive to said raster mapped training signal and said uncorrupted training signal, for deconvolving said raster mapped training signal with said uncorrupted training signal in the frequency domain to generate at least said delay coefficients for application to said filter.

10. A system in a signal receiving apparatus for cancelling multipath signal components in a transmitted signal including a training signal, said training signal including at least one complete repetition of a $2^n-1$ bit pseudorandom sequence, comprising:

means for detecting and sampling said transmitted signal;

filter means, having a plurality of signal paths each including programmable amplitude scaling circuitry responsive to amplitude coefficients and variable delay circuitry responsive to delay coefficients, and having means for combining signals provided by respective ones of said plurality of signal paths, said plurality of signal paths coupled to said means for detecting said transmitted signal, and said means for combining signals, providing said transmitted signal substantially free of said multipath signal components;

means responsive to said sampled transmitted signal, for frequency domain processing said training signal included in said transmitted signal to provide said delay coefficients; and means responsive to said sampled transmitted signal, for time domain processing said training signal included in said transmitted signal to provide said amplitude coefficients.

11. A system for providing a television signal, including a training signal, comprising:

a source of composite television signal;

a source of a raster mapped pseudorandom sequence, said raster mapped pseudorandom sequence comprising a pseudorandom sequence having $2^n-1$ bits normally occurring in a $2^n-1$ sample interval which has been mapped into a $2^r$ sample interval, n and r both integers with r greater than or equal to n; and means for time division multiplexing said composite television signal and said raster mapped pseudorandom sequence.

* * * * *